United States Patent [19]

Becking

[11] Patent Number: 5,364,480
[45] Date of Patent: Nov. 15, 1994

[54] RIBBON LOADING CONTAINER

[76] Inventor: Paul E. Becking, P.O. Box 3200, Monterey, Calif. 93940

[21] Appl. No.: 977,749

[22] Filed: Nov. 16, 1992

Related U.S. Application Data

[63] Continuation of Ser. No. 608,563, Nov. 2, 1990, which is a continuation-in-part of Ser. No. 324,941, Mar. 17, 1989, Pat. No. 4,982,636.

[51] Int. Cl.$^5$ ............................................. B26D 7/00
[52] U.S. Cl. .................................... 156/159; 83/167; 83/277; 83/436; 83/948
[58] Field of Search ..................... 400/194, 196, 196.1; 101/93.13, 336; 242/56 R, 58.1; 53/589, 593; 83/167, 209, 277-280, 358-360, 367, 404, 436, 948

[56] References Cited

U.S. PATENT DOCUMENTS

| | | | |
|---|---|---|---|
| 2,931,482 | 4/1960 | Bishop | 197/175 |
| 4,022,087 | 5/1977 | Queen et al. | 83/27 |
| 4,047,608 | 9/1977 | Willcox | 101/336 |
| 4,050,617 | 9/1977 | Biggs et al. | 226/1 |
| 4,120,239 | 10/1978 | Pasic et al. | 100/26 |
| 4,229,112 | 10/1980 | Schaefer | 400/196.1 |
| 4,247,209 | 1/1981 | Carlson et al. | 400/195 |
| 4,390,294 | 6/1983 | Castro | 400/196.1 |
| 4,408,910 | 10/1983 | Masao | 400/196.1 |
| 4,415,285 | 11/1983 | Bury | 400/196.1 |
| 4,591,084 | 5/1986 | Balian et al. | 242/58.1 |
| 4,609,422 | 9/1986 | Becking | 156/502 |
| 4,624,198 | 11/1986 | Beam et al. | 112/10 |
| 4,632,327 | 12/1986 | Kreeft et al. | 242/56 R |
| 4,645,364 | 2/1987 | Ohsaki | 400/196.1 |
| 4,732,499 | 3/1988 | Nojima et al. | 400/196.1 |
| 4,827,991 | 5/1989 | Jacobsen et al. | 100/32 |
| 4,948,274 | 8/1990 | Mannino | 400/196.1 |
| 4,982,636 | 1/1991 | Becking | 83/167 |

Primary Examiner—David A. Simmons
Assistant Examiner—James J. Engel, Jr.
Attorney, Agent, or Firm—David A. Rose

[57] ABSTRACT

The ribbon loading container and method includes an elongated housing forming an envelope and having front and rear open ends. A ribbon dam is slidingly received within the envelope of the housing and has a slot therethrough for the passage of the ribbon. The ribbon dam further includes tension clips which frictionally engage the ribbon passing through the slot and frictionally engage the sides of the housing. A drive and driven roller are rotatably disposed adjacent the open front end of the ribbon loading apparatus for introducing ribbon into the envelope. The ribbon dam is initially positioned adjacent the open end of the ribbon loading container such that it applies a back pressure to the incoming ribbon being stuffed into the envelope by the drive and driven rollers. As the envelope is filled with inked ribbon, the ribbon dam slides within the ribbon loading container until the pre-selected length of ribbon has been loaded in the container. The leader is detached and the ends of the ribbon are welded to form a continuous loop.

29 Claims, 9 Drawing Sheets

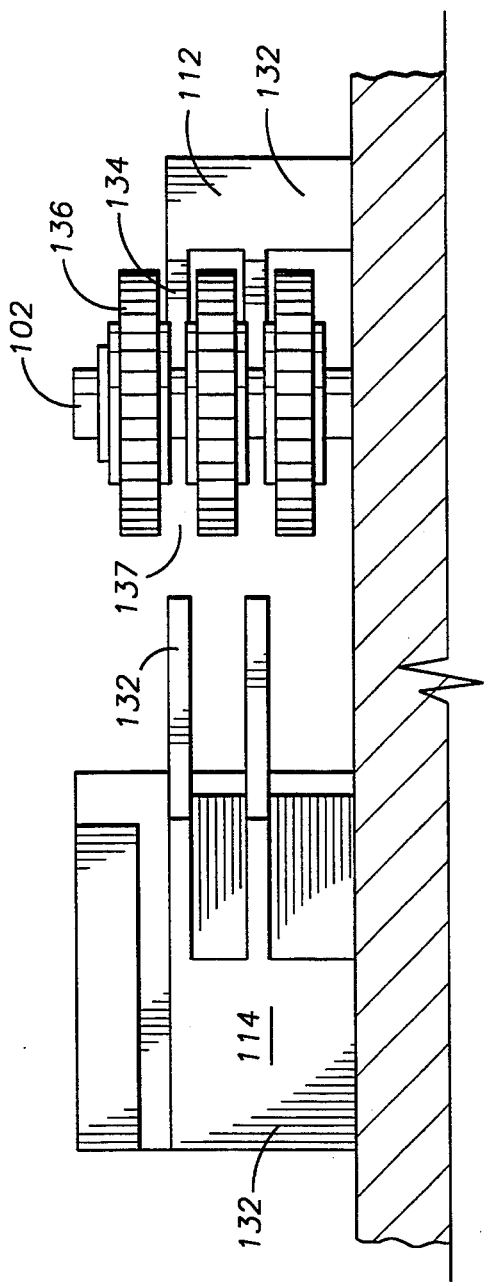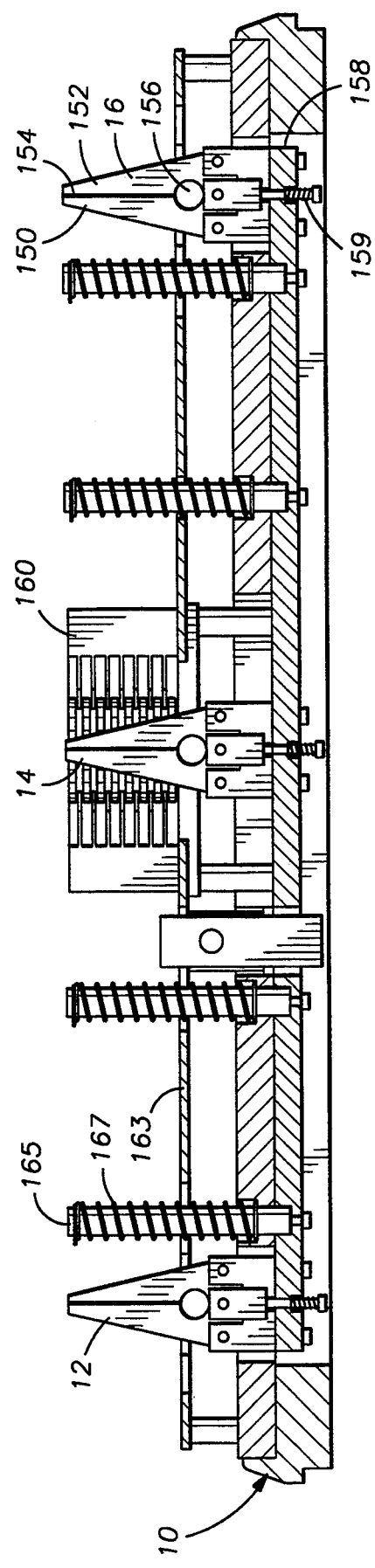
FIG. 7
FIG. 8
FIG. 10

RIBBON LOADING CONTAINER

RELATED APPLICATION

This is a continuation division continuation-in-part of copending application Ser. No. 07/608,563 filed on Nov. 02, 1990, which is a continuation-in-part application of pending U.S. application Ser. No. 07/324,941 filed Mar. 17, 1989, now U.S. Pat. No. 4,982,636, entitled "Measured Leader Length Delivery System".

BACKGROUND OF THE INVENTION

The present invention relates generally to the art of manufacturing ribbon cartridges for printers used with computers and word processors, and, more particularly, to a method and apparatus for loading the ribbon into the cartridge.

Various types of printers are used with computers and word processors. One common type is an impact printer where each character is permanently embossed on a striking surface and the printing of a particular character is accomplished by striking the character against a printer ribbon disposed adjacent the paper surface onto which the characters are to be printed. Another type of printer is the dot matrix printer. The dot matrix printer uses wires arranged in a two-dimensional matrix such that each wire may be independently extended to contact a printer ribbon to print a dot image on the adjacent paper surface. By selectively extending particular patterns of wires, dot images can be combined to form characters on the paper surface. The printer ribbon has ink thereon so as to result in an ink image of the character on the surface of the paper. Printer ribbons typically are made of fabric, such as nylon, or polyester film coated with a carbon-type surface.

In approximately 1970, continuous loop printer ribbon cartridges began appearing on the market. Printer ribbon cartridges include a plastic housing made up of a base shell and a cover shell. Within the cartridge there may be mounted an internal drive mechanism to move the ribbon through the cartridge envelope. The drive mechanism is mounted at one end of the cartridge envelope and often a tension clip is mounted on the other end of the cartridge envelope to maintain tension on the ribbon. The cartridge is loaded with a length of nylon or other fabric ribbon housed in serpentine fashion within the cartridge envelope and the two ends of the printer ribbon are adjoined to form a continuous loop. These continuous loop printer ribbon cartridges are easily removed from and inserted within the printers. Such continuous loop cartridges mechanically simplify the ribbon control portion of printers and thereby eliminate a potential source of failure.

Efforts are continually being made to automate the manufacture of ribbon cartridges. Originally, ribbon cartridges were manually assembled. In the assembly of the cartridge, a drive mechanism is mounted within the base shell. A length of leader ribbon is threaded through the apertures in the envelope of the housing. The ends of the leader ribbon are left extending outside the cartridge. After the leader ribbon is in place, the cover shell of the cartridge is press fitted onto the base shell to enclose the cartridge housing. The exposed ends of the leader ribbon are then attached to the end of an inked printer ribbon. The leader ribbon is then used by the cartridge drive members or an external drive member to draw the appropriate length of inked printer ribbon into the envelope of the previously assembled cartridge. As the motor rotates the drive mechanism, the inked ribbon is folded in a serpentine fashion within the cartridge envelope. Upon completion of the loading, the ribbon is de-leadered and the two free ends of the inked ribbon are welded into a continuous loop by a welder. One apparatus particularly useful in automatically stuffing the assembled cartridge with inked printer ribbon is described in U.S. Pat. No. 4,609,422.

In manufacturing printer ribbon cartridges, it is necessary that the proper length of leader ribbon be used upon assembly of the cartridges. If the leader ribbon does not have the proper length, the ribbon loading apparatus will not be able to load the cartridge with inked ribbon. If the leader is too short, the ribbon loading apparatus will not be able to fully load the cartridge and, if the leader ribbon is too long, the operator must manually jog the drive motor of the ribbon loading apparatus to take up the excess leader. Improper leader length results in waste and additional labor costs.

The automated ribbon manufacturing system practiced by the applicant includes a series of operations stations connected by a transport conveyor with the operations stations and transport conveyor being microprocessor operated and controlled. To convey a ribbon cartridge from station to station, individual cartridges are mounted on nest plates disposed on pallets that are conveyed between the stations by the transport conveyor. The operations stations include the pallet leadering station, the preliminary cartridge assembly station, the completed cartridge assembly station, the cartridge cover press station, the cartridge loading station, and the welding and winding station.

Initially, an empty pallet with a nest plate for a particular size and shape cartridge is positioned at the pallet leadering station where the accumulator on the pallet is filled with a pre-selected length of leader. A robotic arm carries the end of the leader and threads it into the accumulator. The accumulator drive rollers then fill the accumulator with a pre-selected length of leader and the end of the leader is cut. The pallet then moves to the preliminary cartridge assembly station. At that station, the base shell of the cartridge is manually inserted into the nest on the pallet. The drive elements for the cartridge are installed in the cartridge base. The pallet and cartridge base are then moved to the completed cartridge assembly station. There, the end of the leader extending from the accumulator on the pallet is manually threaded through the drive elements and cartridge envelope with the ends of the leader clamped by clamping assemblies located at the corners of the pallet. Any remaining parts of the cartridge are also installed. The cover of the cartridge is then placed over the base. The transport conveyor then moves the pallet to the cartridge cover press station. There, the cover is pressed onto the base.

After the cartridge is assembled, the pallet moves onto the main transit line where a microprocessor properly routes the cartridge for cartridge loading, de-leadering, welding, and winding. At the cartridge loading station, a gripper arm grasps that end of the leader extending from the drive element end of the cartridge and threads the leader end to the tack welder where that end of the leader is clamped. The welder tack welds the ends of the leader to the free end of a length of inked ribbon mounted on a master spool. The other end of the leader extending from the cartridge is pulled by a gripper assembly arm into a set of drive and driven rollers which pull the leader from the cartridge until the inked ribbon is pulled completely through the cartridge envelope. As the leader is pulled through the set of drive and driven rollers, it is sucked away by a vortex and cut off when the operations station senses the inked ribbon. The end of the ribbon is then clamped onto the pallet. The inked ribbon must be loaded into the cartridge envelope simultaneously with the pulling of the leader so as to provide a supply of inked ribbon to replace the leader within the cartridge envelope as the leader ribbon is removed. Simultaneously with the gripper arm assembly pulling the leader and inked ribbon through the cartridge envelope, the drive elements on the cartridge are activated by a motor drive so as to commence the loading cycle during the time the leader is being removed. The ribbon is folded in a serpentine manner within the cartridge envelope. The ribbon is cut from the master spool. The ends of the ribbon are now clamped by the clamping assemblies on the pallet. The pallet then moves to the welding and winding station where the ends of the ribbon are tensioned for the welding operation. The ends of the ribbon are welded and cut discarding the trim. The welded ribbon is ironed and the ribbon is wound into the cartridge to take up the slack left from welding. The cartridge is then ready to be sent to packaging.

The automation of the manufacture of printer ribbon cartridges is severely hindered by the large number of different printer cartridges. There is estimated to be over 500 different sizes and configurations of printer ribbon cartridges severely restricting the ability of the manufacturer to design uniform automation equipment that can handle this wide variety of cartridge designs during each of the individual manufacturing operations. Thus, continuous efforts are being made on improvements in the manufacturing process and apparatus to universally accommodate these multiple cartridge designs in the automated manufacturing process.

In particular, because there are such a variety of cartridge sizes and shapes, it is very difficult to configure the apparatus and process for loading this large variety of cartridge sizes and shapes with inked ribbon. With such a wide variety of cartridge designs, a different nest plate must be used for each of the different cartridges throughout the process so as to accommodate the loading, welding and winding operations. The ideal manufacturing operation would be able to accommodate all sizes and configurations of cartridge and all types and widths of printer ribbons without requiring different nest plates or substantial changes in the setup of the individual manufacturing operations.

The prior art system of loading a printer ribbon cartridge with inked ribbon included using the cartridge drive mechanism to draw the inked printer ribbon into the envelope of the cartridge. The drive mechanism of the cartridge comprises drive and driven rollers are made of thermoplastic. The thermoplastic will deteriorate if rotated at high speeds. For example, a thermoplastic cartridge drive made of Delrin manufactured by E. I. DuPont Corporation will operate at speeds up to 3900 rpms without lubrication. However, thermoplastic cartridge drives made of other plastics such as styrene will only operate at speeds up to 2000 rpms. The drive mechanism of a printer cartridge is never operated above 1000 rpms during normal printing operation and therefore the mechanism is not designed to operate at high speed rotation. The torque applied to the thermoplastic journals on the cartridges during the ribbon loading operation requires that the cartridge drive mechanisms be operated at limited speeds due to the limited capability of the mechanism. It is preferred that the cartridge loading operation be performed at high speeds not only to save machine time but also it has been found that high speed loading causes the serpentine folds to be more evenly spaced and distributed within the envelope of the cartridge. To overcome the deficiencies of using the thermoplastic cartridge drive mechanism for the ribbon loading operation, it is preferred to use external drives having precision journal bearings that will allow high speed rotation to not only reduce ribbon loading time but also to allow more even serpentine folds within the cartridge envelope.

SUMMARY OF THE INVENTION

The ribbon loading container and method in accordance with the present invention includes an elongated housing forming an envelope and having front and rear open ends. A ribbon dam is slidingly received within the envelope of the housing and has a slot therethrough for the passage of the ribbon. The ribbon dam further includes tension clips which frictionally engage the ribbon passing through the slot and frictionally engage the sides of the housing. The ribbon loading container is positioned on the nest plate of a pallet. A drive and driven roller are rotatably disposed adjacent the open front end of the ribbon loading apparatus for introducing ribbon into the envelope. An accumulator is also disposed on the pallet for receiving a pre-selected length of leader ribbon which is threaded between the drive and driven rollers, envelope and ribbon dam. The end of the leader ribbon is welded to the inked ribbon and the drive roller is actuated to introduce the ribbon into the envelope of the ribbon loading container. The ribbon dam is initially positioned adjacent the open end of the ribbon loading container such that it applies a back pressure to the incoming ribbon being stuffed into the envelope by the drive and driven rollers. As the envelope is filled with inked ribbon, the ribbon dam slides the length of the ribbon loading container until it reaches the end of the container. The leader is detached and the ends of the ribbon are welded to form a continuous loop. Subsequently, the ribbon is unloaded from the ribbon loading container and loaded into a printer cartridge.

The present invention includes an independent ribbon loading container. The container is substituted for the cartridge in the ribbon loading, welding and winding operation. The container is loaded with an ultrasonically welded, continuous loop of ribbon which is pre-inked, pre-folded, and self-contained. By utilizing a container with standard features, the difficulty of multiple cartridge sizes and configurations is eliminated. Further, the drive mechanism for loading the container is rotatably disposed on the pallet in journal bearings having high speed precision bearings to allow high speed ribbon loading to achieve even serpentine folds of the ribbon within the container.

Other objects and advantages of the present invention will become apparent from the following description.

BRIEF DESCRIPTION OF THE DRAWINGS

For a detailed description of the preferred embodiment of the invention, reference will now be made to the accompanying drawings wherein:

FIG. 7 is a cross-sectional view of the guide block on the nest plate shown in FIGS. 4, 5 and 6;

FIG. 8 is an elevation view of the driven roller stripper, drive roller, and drive roller stripper mounted on the nest plate shown in FIGS. 5 and 6;

FIG. 10 is an elevation view of the accumulator, clamping assemblies, and pallet shown in FIGS. 1 and 2.

DESCRIPTION OF THE PREFERRED EMBODIMENT

Figure 1:
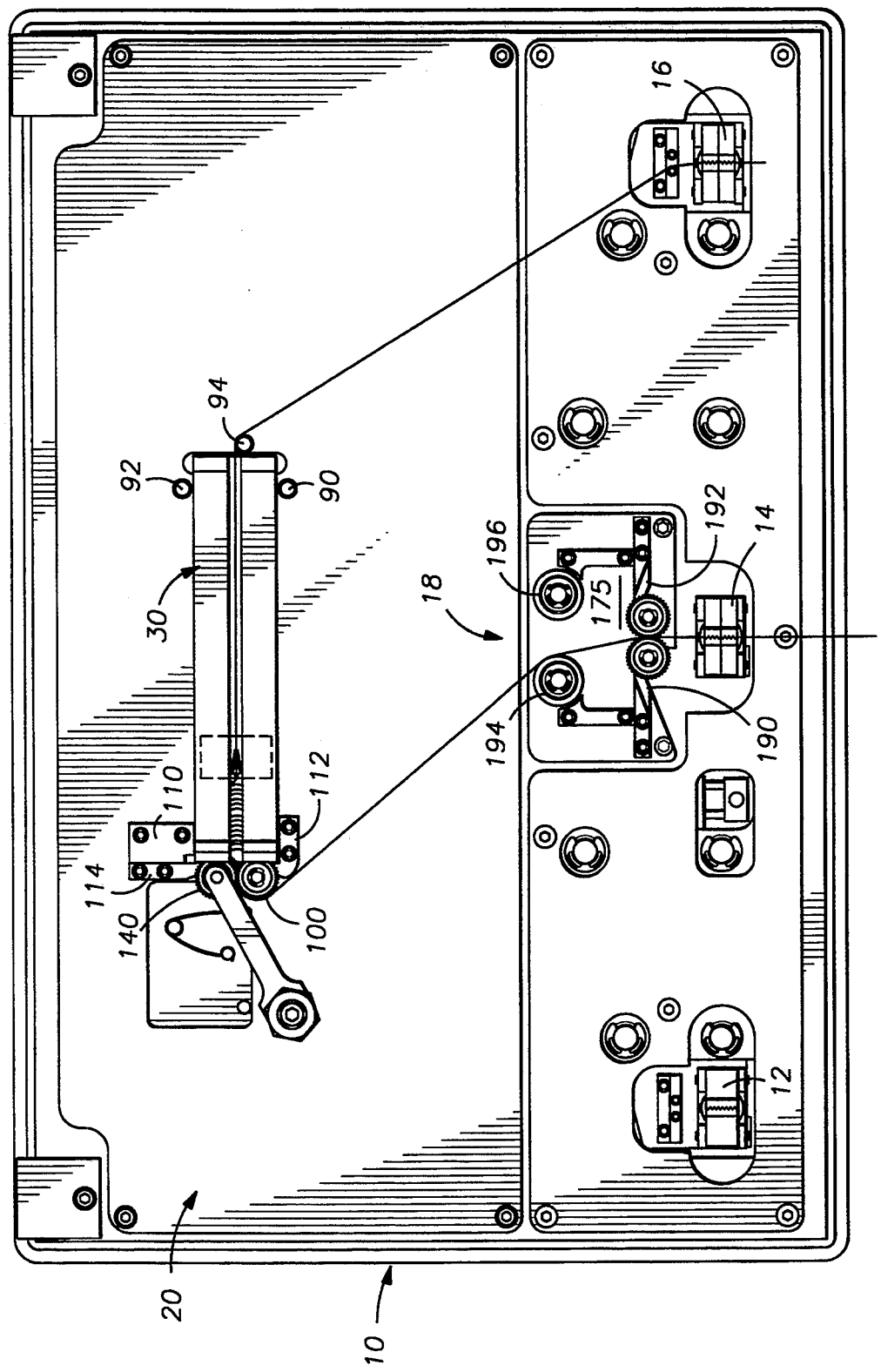
FIG. 1 is a plan view of the pallet with nest plate and the ribbon loading container of the present invention.
Figure 2:
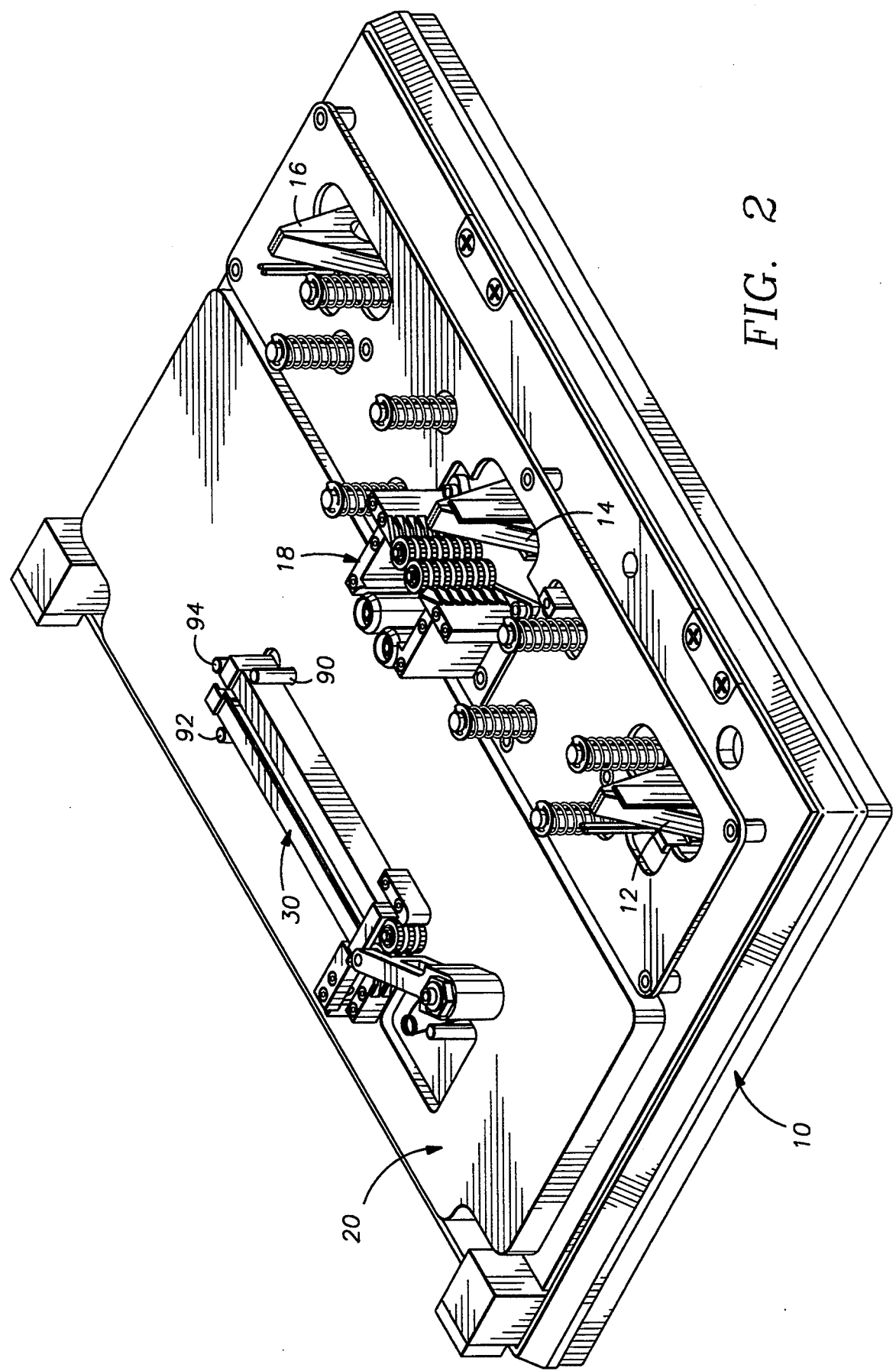
FIG. 2 is a perspective view of the pallet, nest plate and ribbon loading container of FIG. 1.

Referring initially to FIGS. 1 and 2, there is shown a pallet 10 manufactured in part by the Bosch Company and having mounted thereon a plurality of clamping assemblies 12, 14, 16, a leader accumulator 18, and a nest plate 20 for receiving a ribbon loading container 30. The ribbon loading container 30 is an elongated enclosure for receiving a pre-selected length of inked nylon ribbon, such as ribbon 31 shown in FIG. 1, for loading into a ribbon cartridge.

Figure 3:
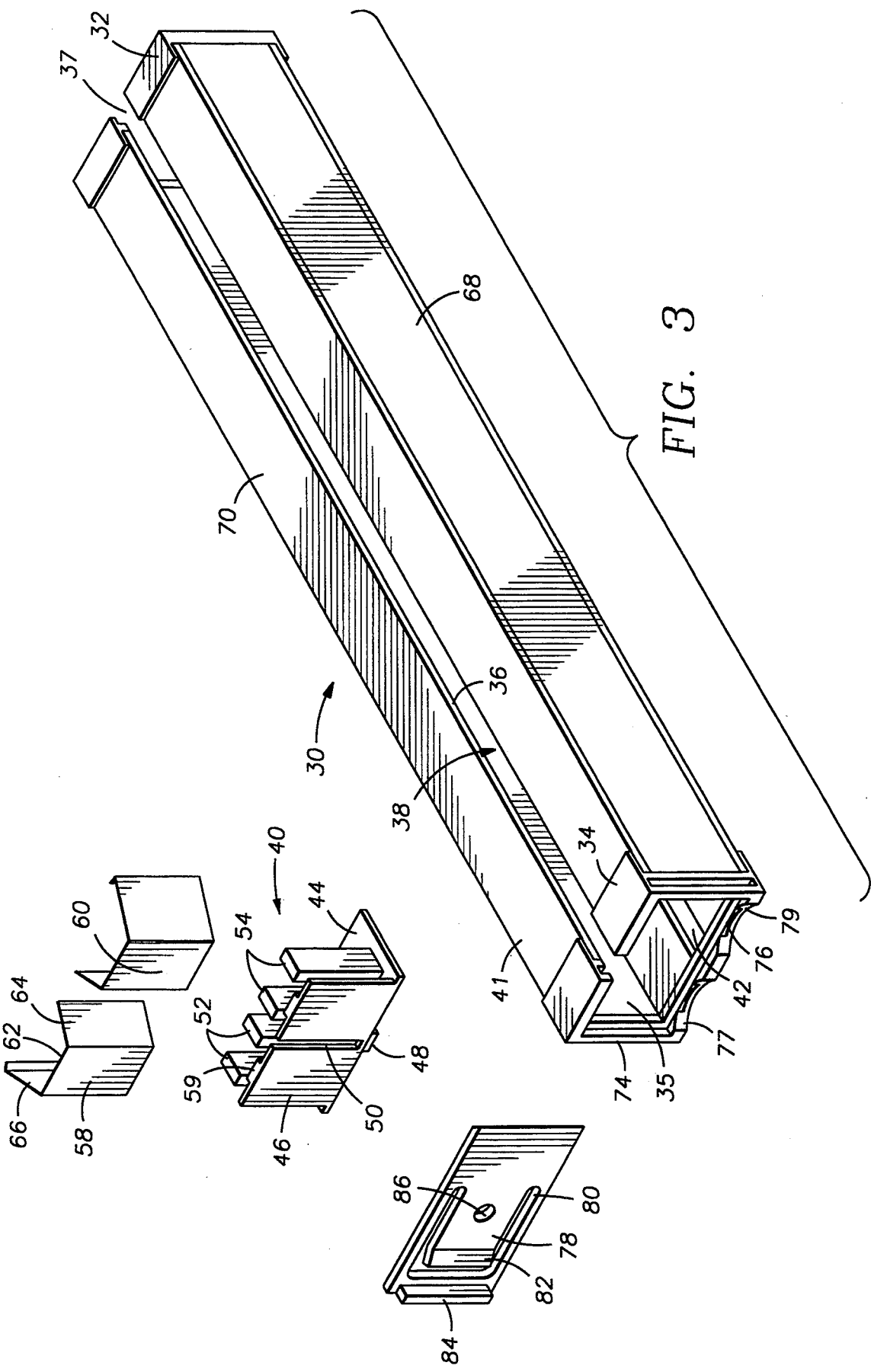
FIG. 3 is an exploded view of the ribbon loading container shown in FIGS. 1 and 2.
Figure 4:
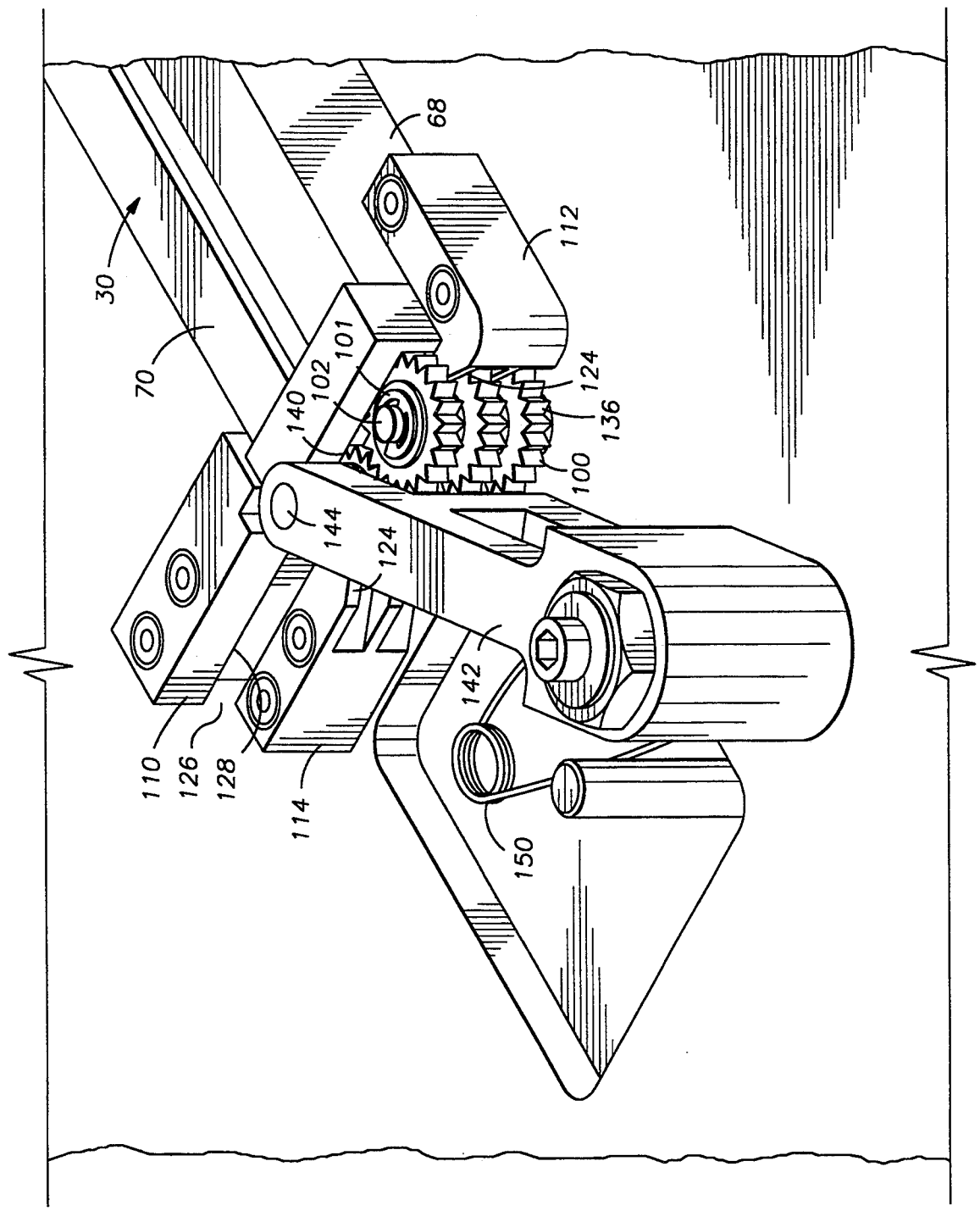
FIG. 4 is a perspective view of the nest plate with the drive mechanism for the ribbon loading container shown in FIGS. 1 and 2.
Figure 5:
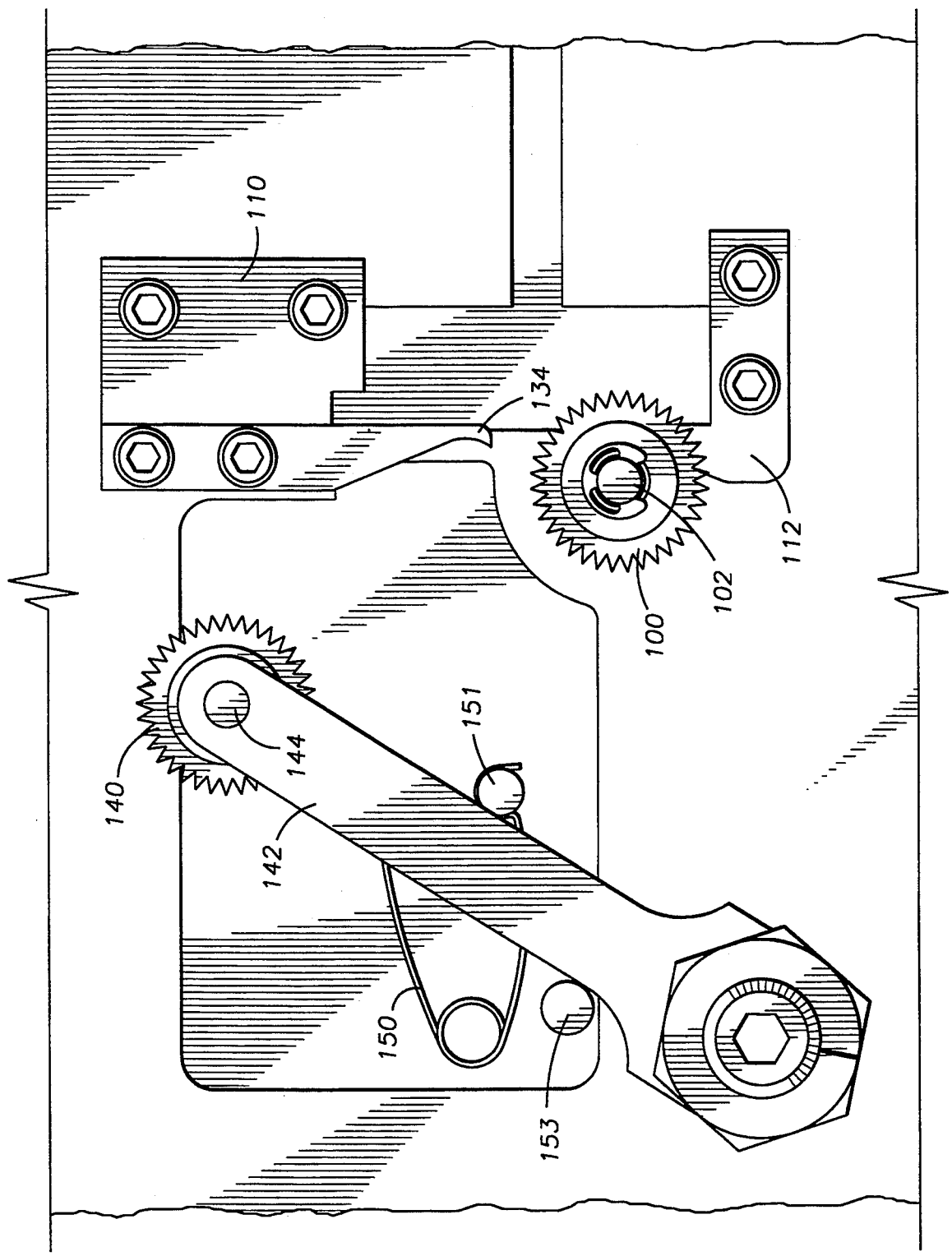
FIG. 5 is a plan view of the drive mechanism shown in FIG. 4 in the non-engaged position.

Referring now to FIG. 3, the container 30 has an elongated, extruded plastic body with fitted molded plastic rear and front end caps 32, 34, respectively, and a sliding ribbon dam 40 to be disposed therein. The body of container 30 has a generally rectangular cross-section with open front and rear ends 35, 37, respectively, to be inserted into recesses 39 molded into the plastic end caps 32, 34. The container 30 includes a longitudinal aperture 36 extending the length of the top side 41 of container 30 to permit access to the interior envelope 38 of the ribbon loading container 30. Extending along the bottom of container 30 is a longitudinal groove 42 for positioning ribbon dam 40.

The ribbon loading container 30 is produced in various sizes to accommodate the different widths of ribbon and the different lengths of continuous loops, for example, ¼, 5/16, ⅜, and ½ through 1½ inches. Loop lengths of 5 through 100 yards fit into containers of widths of ¾ inch to 4 inches as required.

The ribbon dam 40 is generally L-shaped in cross-section with a horizontal flat base 44 and an upwardly projecting wall 46. The base 44 includes a key 48 projecting downwardly from the bottom surface thereof which is received within the elongated groove 42 in the bottom of container 30. The vertical wall 46 includes a vertical slot 50. Two pairs of upwardly projecting positioning members 52, 54 project upwardly from the base 44 adjacent wall 46. A pair of projecting ridges 55 on wall 46 face members 52, 54. The positioning members 52, 54 and wall 46 form a receiving slot 56 for tensioning clips 58, 60.

Tension means are provided to maintain frictional engagement with the ribbon and with the lateral sides 68, 70 of the container 30. The two tension clips 58, 60 are folded strips of thin metal having a generally U-shaped cross section. The U-shaped cross section causes each clip to have a base portion 62 from which extends two side portions 64, 66. The base portion 62 is received within the slot 56 between ridges 55 of vertical wall 46 and positioning members 52, 54 with the interior side portions 64 mating and engaging adjacent the vertical slot 50 of vertical wall 46 as shown in FIG. 1. The outer side portions 66 engage the elongated side walls 68, 70 of the ribbon loading container 30.

Once fitted with the tension clips 58, 60, the ribbon dam 40 is placed inside the ribbon loading container 30 through the rear end cap 32. The guide key 48 is received within the bottom groove 42 of container 30 so as to be positioned within the container as it is allowed to reciprocate the length of the rectangular envelope 38 formed by container 30. The guide key 48 and groove 42 form a cooperative alignment or guide means for ribbon dam 40. The outer side portions 66 of the tension clips 58, 60 provide tension between the ribbon dam 40 and the ribbon loading container 30. The leader or ribbon is threaded through the vertical slot 50 and between interior side portions 64 of tension clips 58, 60 of ribbon dam 40.

The ribbon loading container 30 further includes an end cover 72. The end cover 72 is generally rectangular and includes a spring latch or gate 78 which is formed by cutting a generally U-shaped slot 80 in the end cover 72. The free end 82 of gate 78 is molded outward to form a lip or abutting portion. Adjacent the abutting portion 82 is a vertical stop member 84 extending from the terminal end of the end cover 72. The end cover 72 fits into a slot 74 in the side of front end cap 34 and slides in opposed grooves 76 in cap 34 in a transverse direction. When in the closed position, the end cover 72 closes the front end 35 of container 30 and only allows one strand of ribbon to pass. A detent hole 86 is provided in gate 78 for receiving a detent ball as hereinafter described.

The container is positioned and mounted on the nest plate 20 which functions in cooperation with the pallet 10. The nest plate 20 is an aluminum plate upon which the components unique to the ribbon loading operation are mounted. The nest plate is recessed at specific locations in order to conform to the contours of mating parts on the pallet 10. Nest plate 20 allows the container drive to be located at eight different positions to accommodate positions left or right of the accumulator. The container 30 may be de-leadered from either the left or right as required by the container application.

Referring now to FIGS. 1, 2, 4, 5 and 6, the rear end cap 32 of ribbon loading container 30 is positioned on the nest plate 20 by three positioning pins 90, 92, and 94. Positioning pins 90, 92 are opposed to each other and are adjacent the rear end of sides 68, 70 of container 30. End pin 94 is positioned adjacent the rear end cap 32. The front end of container 30 is positioned by drive roller stripper 112, driven roller stripper 114, and guide block 110. The drive roller stripper 112 and guide block 110 position the front end of sides 68, 70 of container 30. The drive roller stripper 112 and driven roller stripper 114 engage the front end cap 34 of container 30. Thus, the positioning members 90, 92, 94 and strippers 112, 114 and guide block 110 position ribbon loading container 30 on nest plate 20 so as to be properly positioned for the various operation stations as hereinafter described.

Referring now to FIG. 7, the guide block 110 includes a detent aperture 116 extending therethrough with aperture 116 having a restricted opening at 118. A detent ball 120 is housed in aperture 116 and biased against restricted opening 118 by a spring 122. A bolt 124 is threaded within aperture 116 and supports spring 122 and closes aperture 116. The block 110 further includes a horizontal slot 126 therethrough sized to slidingly receive end cover 72. A clearance opening 128 is provided adjacent slot 126 to permit the gate 78 to clear guide block 110 and pass therethrough. Detent ball 120 engages the detent hole 86 in end cover 72 to maintain end cover 72 in the open position during the ribbon loading operation.

Referring now to FIGS. 4, 5, 6, and 8, a drive roller 100 is rotatably mounted on a shaft 102 in a journal bearing having precision bearings. A C-clip 101 maintains roller 100 on shaft 102. Shaft 102 extends through the journal bearing (not shown) housed in nest plate 20. Shaft 102 is driven by an electric motor (not shown). A driven roller 140 is rotatably disposed on swing arm 142, as hereinafter described, and may be positioned adjacent drive roller 100. Drive roller 100 and driven roller 140 include a plurality of projecting roller surfaces 136 for engaging the leader or ribbon. Roller surfaces 136 are manufactured from or coated with a rubber or elastomeric material so as to engage the leader or ribbon without damaging the ribbon as it is forced into container 30.

Driven roller 140 is rotatably mounted on the end of swing arm 142 and is fitted with precision bearings in a bearing journal to rotate freely on a shaft 144 which is pressed into swing arm 142. The other end of swing arm 142 is rotated on an eccentric spacer 146, best shown in FIG. 6, mounted on nest plate 20. To adjust the proximity of the driven roller 140 with respect to the drive roller 100, the driven roller arm 142 is rotated on eccentric spacer 146. When the spacer 46 is rotated, its eccentricity results in a translation of the driven roller 140 to provide an adjustment means for driven roller 140. As spacer 146 is rotated, its eccentricity results in a translation of the driven roller 140 with respect to strippers 112, 114 and drive roller 100. A torsion spring 150 engages swing arm 142 nest plate 20 at 151 to either hold driven roller 140 in the non-engaging position shown in FIG. 5 or in the engaging position, with roller 140 in contact with the ribbon and drive roller 100 shown in FIG. 6. A stop member 153 limits the movement of swing arm 142 in the non-engaging position. The driven roller swing arm 142 may be rotated to the non-engaged position to permit the threading of a leader ribbon through container 30. Once threading is complete, the drive roller is rotated into engaged position sandwiching the ribbon.

The purpose of drive roller 100 is to expel and stuff ribbon into the container 30. It does so in conjunction with driven roller 140. Rollers 100, 140 are positioned such that a portion of the roller extends into arcuate recesses 77, 79 of front end cap 34, best shown in FIG. 3, to ensure that the ribbon is introduced through the front end 35 of container envelope 38. By rotatably disposing drive roller 100 and driven roller 140 in a journal bearing with high precision ball bearings, the drive means for stuffing and loading container 30 with ribbon may be operated at speeds up to 5000 rpms without causing bearing problems. These precision metal journal bearings can withstand the torque applied by the electric drive motor by these high rpms. The higher speeds allow the ribbon to be loaded into the envelope of the container 30 with very even serpentine folds. Strippers 112, 114 are used in conjunction with each of these rollers 100, 140 to ensure that the ribbon does not wrap around them.

Figure 6:
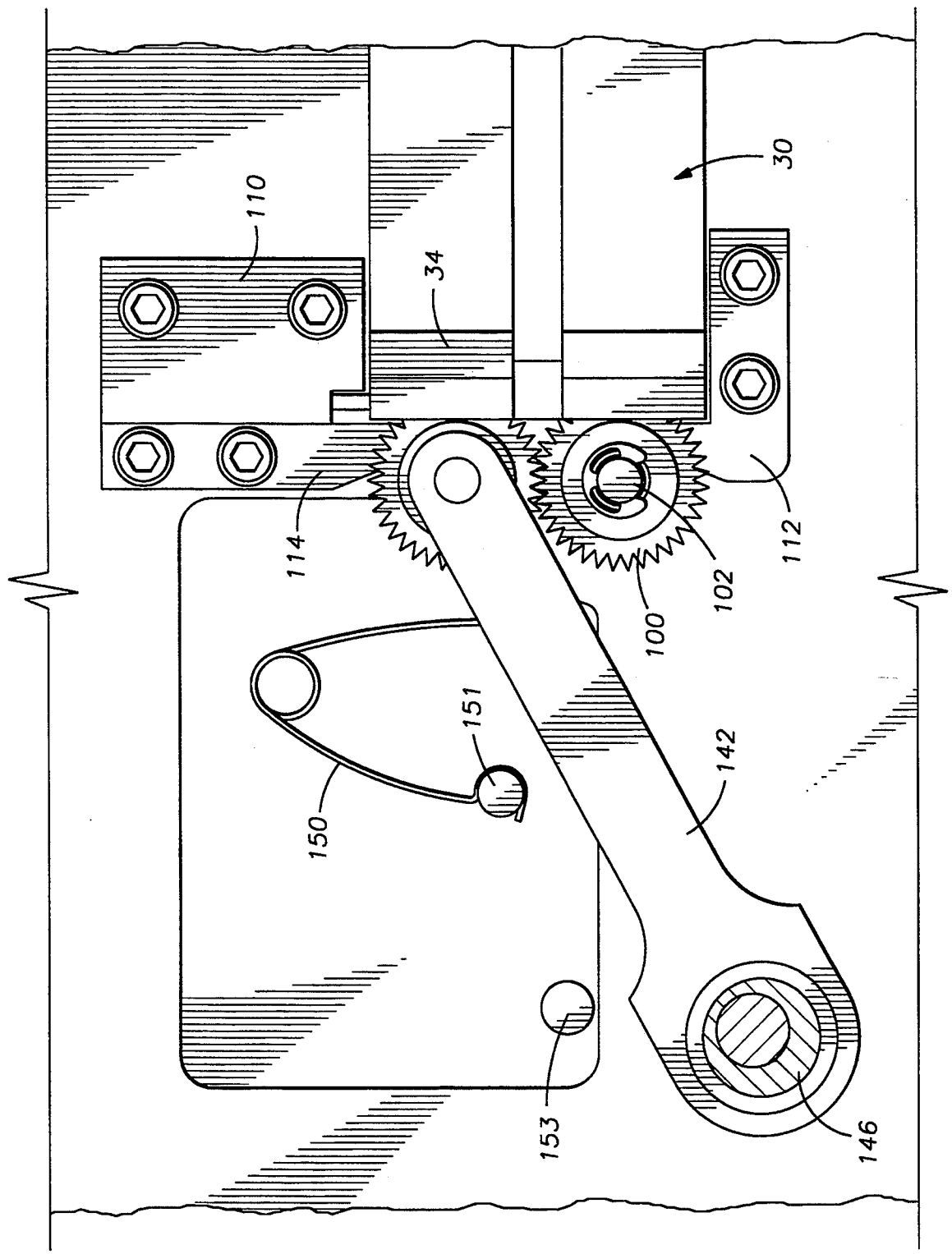
FIG. 6 is a plan view of the drive mechanism shown in FIG. 5 in the engaged position.

Referring now to FIGS. 6 and 8, the driven roller stripper 114 is positioned adjacent guide block 110 and is sized to extend past a portion of the front end cap 34 of container 30. Strippers 112, 114 include body portions 132 and a plurality of curved fingers 134 extending therefrom. Each stripper 112, 114 has from one to four curved fingers 134. Drive roller 100 and driven roller 140 are positioned adjacent strippers 112, 114 such that the curved fingers 134 are disposed between the projecting roller surfaces 136 and occupy the gaps 137 between the rollers' two-to-five contact surfaces 136. The strippers 112, 114 are milled from aluminum and are bolted to the nest plate 20. Fingers 134 serve to prevent the leader or ribbon from being drawn around the rollers 100, 140 but be drawn between them and into container 30 as desired.

A typical ribbon cartridge includes a base shell and a cover shell. The assembled cartridge includes an inlet aperture or slot and an exit aperture or slot. Adjacent the inlet slot may be rotatably mounted a pair of drive elements between which are threaded the ribbon. A tensioner clip may be mounted at the exit slot of the cartridge to bind the ribbon against the cartridge wall to provide tension on the ribbon. The drive elements include a pair of end rollers, one of which includes a shaft that extends outside the cartridge for attachment to a drive motor. The base of the cartridge forms an envelope for housing the ribbon folded in a serpentine fashion extending the length of the enclosure.

Figure 9:
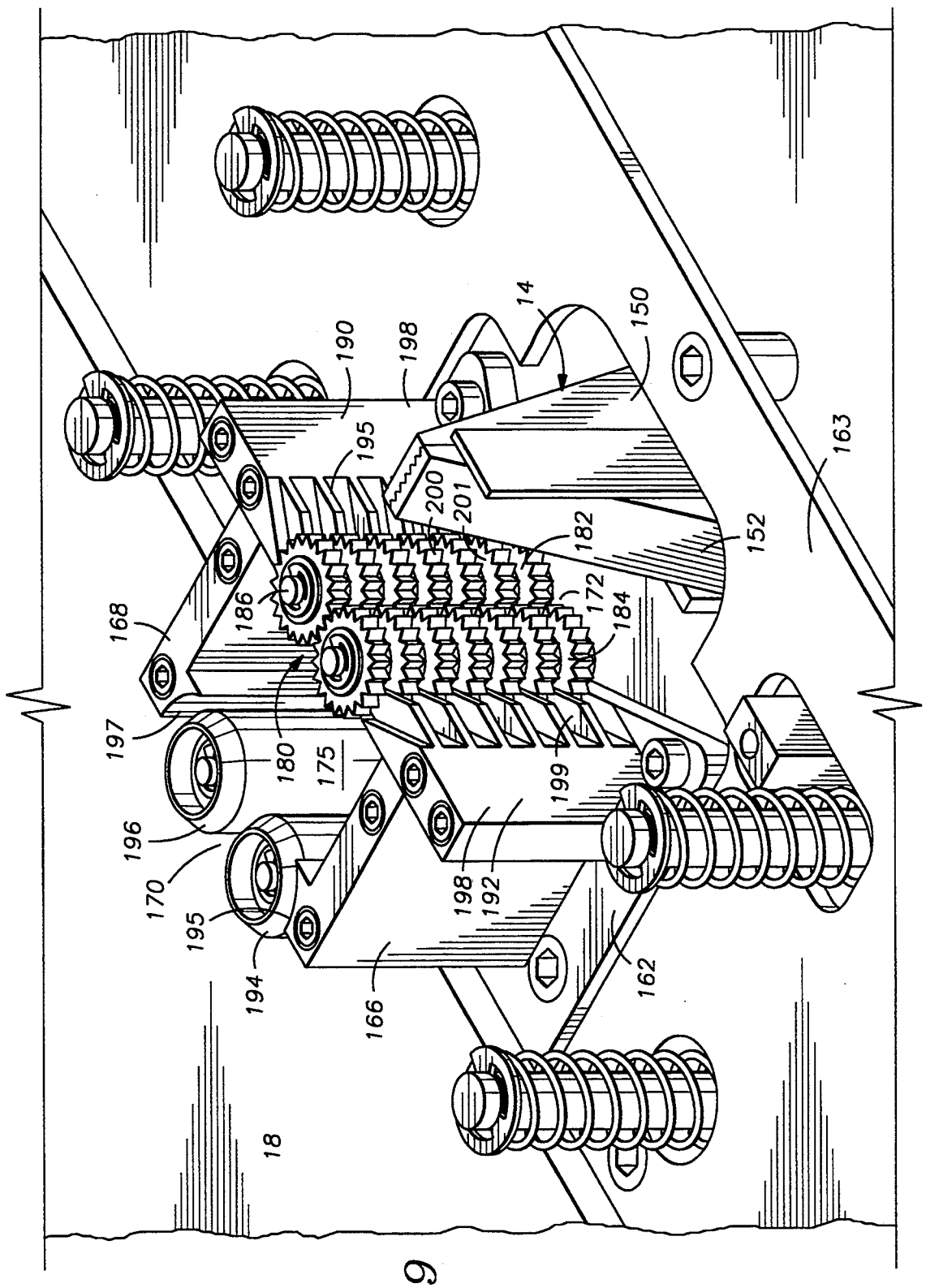
FIG. 9 is a perspective view of the accumulator shown in FIGS. 1 and 2.
Figure 11:
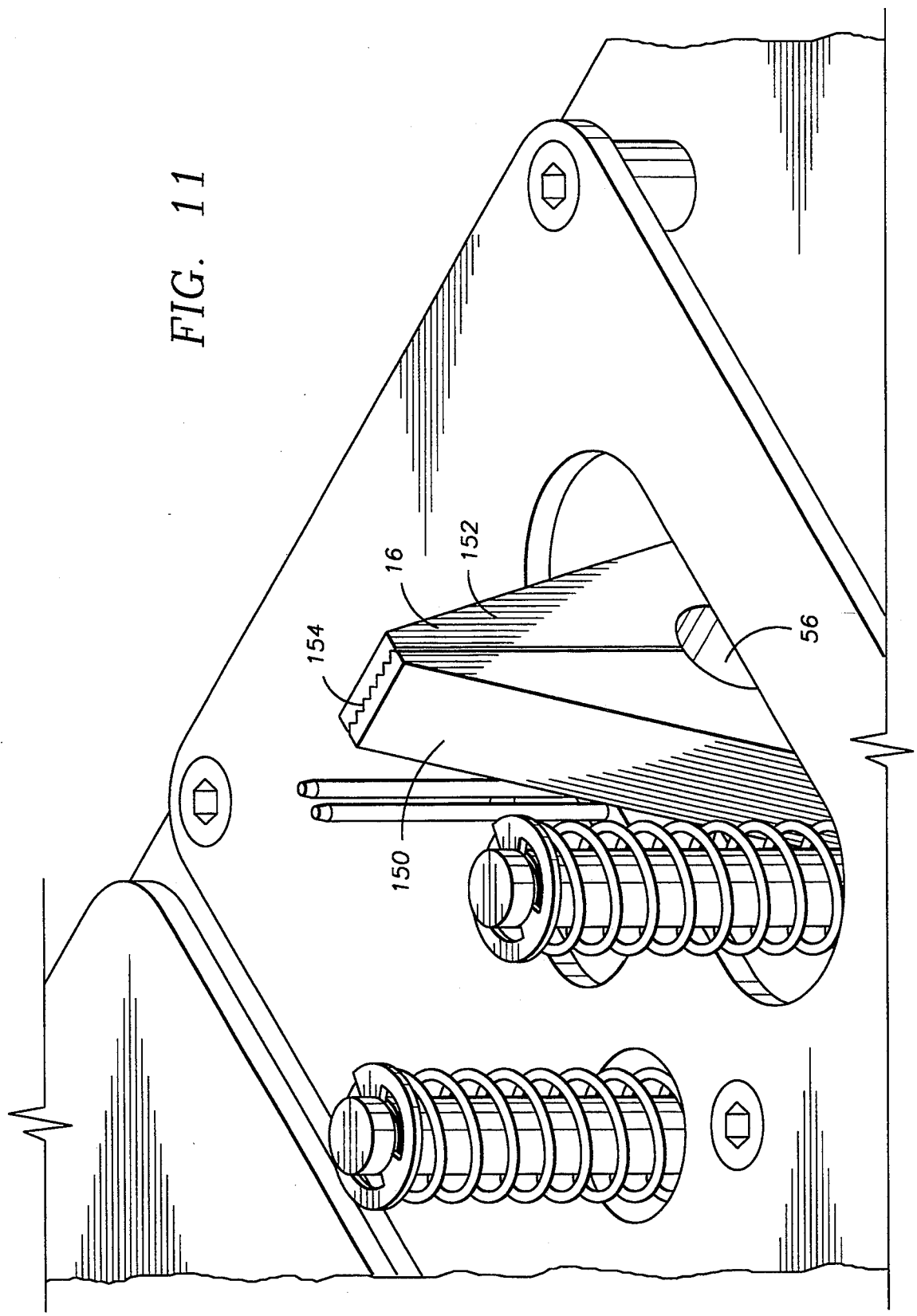
FIG. 11 is a perspective view of one of the clamping assemblies disposed on the pallet shown in FIGS. 1 and 2.

Referring now to FIGS. 9, 10 and 11, the pallet 10 includes a plurality of clamping assemblies 12, 14, 16 for clamping and gripping the ends of the leader or ribbon. Each clamping assembly 12, 14, 16 includes a pair of clamping jaws 150, 152 having facing serrated surfaces 154 for gripping the surface of the leader or ribbon. The pair of jaws are pivotally mounted on a shaft 156. The shaft 156 is mounted on a plunger rod 158 that is positioned to be engaged by a pneumatic cylinder (not shown) for pushing the clamping assembly upward. A compression spring 159 is housed around rod 158 whereby as the rod 158 and clamping assembly are moved upward by the pneumatic cylinder, the jaws 150, 152 open and pivot on the shaft 156 so as to receive the ribbon or leader. Once the ribbon or leader is in place, the pneumatic cylinder retracts and the spring 159 pushes the plunger rod 158 down and allows the clamp jaws 150, 152 to close and grip the leader or ribbon therebetween. For a further description and other embodiments, U.S. patent application Ser. No. 07/324,941 filed Mar. 14, 1989 now U.S. Pat. No. 4,982,636, is incorporated herein by reference.

Referring now to FIGS. 1, 2, 9, and 10, the accumulator assembly 18 includes a generally box-like enclosure 160 in which a measured length of leader ribbon is stuffed by a drive assembly 180 and stored until needed for the ribbon loading compartment 20. The accumulator 18 is a component of the pallet 10 which stores a specific length of leader to be used to thread the actual ribbon. The accumulator 18 extends through an aperture 161 in the upper deck 163 of pallet 10 and includes a base 162 mounted on a retractable plate 164 disposed below the upper deck 163. It should be noted that retractable plate 164 is mounted on posts 165 with springs 167 to allow the clamps 12, 14, 16 and accumulator 18 to be recessed into pallet 10 for certain operations stations. The pallet 10 has a base plate 169 which retains the lower ends of springs 167 which are compressed when retracting plate 164 is pulled into its downward position.

Accumulator drive assembly 180 generally comprises a drive roller 182, idler roller 184, and stepping motor (not shown). The stepping motor actuates drive roller 182 and, through the cooperation of idler roller 184, stuffs a measured length of leader ribbon into accumulator chamber 175. Drive roller 182 is mounted adjacent to right stripper 190. Drive roller 182 includes a roller shaft 186 which is rotatably supported within an aperture in accumulator base 162. The stepping motor (not shown) is disposed at the operations station and the pallet 10 is positioned over the motor such that the motor is underneath the base plate of the pallet 10. The motor shaft of the motor is aligned with roller shaft 186 to operatively engage the shaft 186 to operate the drive assembly 180.

Strippers 190, 192 include body portions 194 and a plurality of curved fingers 199 extending therefrom. Drive and idler rollers 182, 184 include a plurality of projecting roller surfaces 200 for engaging leader ribbon. Roller surfaces 200 are manufactured from or coated with a rubber or elastomeric material so as to engage leader ribbon without damaging the ribbon as it is drawn into accumulator chamber 175. Rollers 182, 184 and strippers 190, 192 are positioned such that curved fingers 199 are disposed between the gaps 201 of projecting roller surfaces 200 of rollers 182 and 184, fingers 199 serving to prevent the leader ribbon from being drawn around rollers 182 and 184, but be drawn between them and into accumulator chamber 175 as desired.

Accumulator enclosure 160 includes left and right side walls 166, 168 and a pair of adjacent rollers 194, 196 which project vertically from accumulator base 162 adjacent arcuate corners 195, 197 of walls 166, 168. Together, these components form the interior chamber 175 generally formed by the inner surfaces of accumulator base 162, the rollers 194, 196, side walls 166, 168, strippers 190, 192 and rollers 182, 184.

Left and right side walls 166, 168 are positioned upon and attached to accumulator base 162 opposite and substantially parallel to one another such that an outlet gap 170 is formed between the vertical rollers 194, 196. Strippers 190, 192 are attached to accumulator base 162 generally perpendicularly to the ends of left and right side walls 166, 168 such that an outlet gap 172 forms between the ends of strippers 190, 192, and is aligned with gap 170. The separation between the rollers is aligned with gaps 170, 172 so as to form a path for a gripping assembly (not shown) to transport leader ribbon through accumulator chamber 175 as the gripper assembly moves across the accumulator.

The control system is centered around a controller which may comprise, for example, a digital control circuit designed in accordance with principles well known in the art to affect the operation of the controller. The control system comprises a plurality of control inputs and outputs. Inputs comprise switches and sensors located throughout the system for operating the motor and pneumatic cylinders associated with pallet 10.

In operation, the automated ribbon manufacturing system includes a transport conveyor with a series of work stations operated and controlled by a microprocessor. The operations stations include a pallet leadering station, a ribbon loading container leadering station, a container loading station, a welding and winding station, and a container unloading station.

At the pallet leadering station, a pre-selected length of leader is passed into the accumulator 18. A gripping assembly (not shown) threads the end of the leader ribbon from a master reel through the gap 172 between drive roller 182 and idler roller 184, into accumulator chamber 175 and through the gap 170 between vertical rollers 194, 196. The stepping motor (not shown) of the accumulator drive assembly 180 is then actuated to draw a pre-selected length of leader ribbon from the master spool into the accumulator chamber 175. The clamping assembly 14 on pallet 10 then clamps the end of the leader ribbon which is then cut from the remainder of the leader ribbon on the master spool.

The pallet 10 then moves to the container leadering station where the leader ribbon is to be manually or automatically threaded through the ribbon loading container 30. At the container leadering station, the container 30 is placed onto the nest plate 20 between the position posts 90, 92, 94. The end cover 72 is placed in its respective guide 110. An automated system or the assembler moves the ribbon dam 40, which has been pre-inserted into the container 30, to the front end of container 30. The tension clips 58, 60 press against the interior side walls of the container 30 to maintain ribbon tension during the loading process. The assembler or an automated mechanism then threads the ribbon leader from the accumulator 18, around the drive roller 100, through the ribbon dam 40 and the longitudinal aperture 36 of ribbon loading container 30, and into the appropriate ribbon clamp assembly 12 or 16 such as shown in FIG. 1. Once the driven roller arm 142 has been rotated into contact with the drive roller 100, the pallet 10 is released. Alternatively, the arm 142 and driven roller 140 may be rotated into contact with the drive roller 100 at the container loading station.

The pallet 10 with the leader loaded in the container 30 is then moved to the container loading station where the leader is welded to a length of inked ribbon stored on a master reel (not shown) and the ribbon is loaded into the container 30 and de-leadered. Then the front end cover 72 is closed and the driven roller arm 142 is opened. The tension clips 58, 60 and ribbon dam 40 remain at the front of the ribbon loading container 30 until loading begins. At that time, the ribbon dam 40 is forced back longitudinally within the container 30 by the flow of incoming ribbon, acting as a dam, and creating back pressure against the ribbon. The pressure of the incoming ribbon overcomes this back pressure to move the ribbon dam 40 back toward the rear of container 30. This back pressure improves the quality and uniformity of the ribbon folds. The high speed loading permits an even serpentine folding of the ribbon within the envelope 38. When the required length of ribbon has been loaded into the container 30, the dam 40 travels toward the end of the envelope 38 until the ribbon is loaded. The rear cap 32 on the container 30 will stop the ribbon dam 40 when the container 30 is to be completely filled or partially filled, closing the rear of the container 30 through which only one strand of ribbon will be allowed to pass. Therefore, the container 30 can be used for variations in ribbon lengths reducing the multiples of containers 30 needed. The length of ribbon loaded is microprocessing controlled.

The container 30 is then transported to a ribbon welding and winding station which joins the free ends of the ribbon to form a continuous loop.

Finally, the container reaches the container unloading station and the container 30 is removed from the pallet 10. The inked ribbon loaded into the container 30 is later unloaded into the base shell of an empty cartridge by the customer's cartridge assembler. A wand may be used to remove the ribbon from container 30 by projecting the wand through the rear end 37 or envelope 38 of container 30. The assembly of the cartridge is then completed.

The container 30 provides a means whereby ribbon may be introduced to a ribbon cartridge in a readily usable form. The cartridge assembler simply opens end cover 72 of container 30 and slides the ribbon into the empty cartridge. The container 30 contains an ultrasonically welded, continuous loop of ribbon. The ribbon is pre-inked, pre-folded, and self-contained which makes the manufacturing process beyond cartridge assembly unnecessary.

While a preferred embodiment of the invention has been shown and described, modifications thereof can be made by one skilled in the art without departing from the spirit of the invention.

I claim:

1. A ribbon loading container for loading a preselected length of printer ribbon in a cartridge, comprising:
    an elongated housing forming an envelope and having front and rear open ends;
    a ribbon dam slidingly received within said envelope of said housing and having a slot therethrough for the passage of the ribbon; and
    said ribbon dam further including first tension means for maintaining frictional engagement with the ribbon and second tension means for maintaining frictional engagement with said housing whereby the ribbon may be introduced into said front open end and become housed within said housing against the back pressure of said ribbon dam due to said second tension means.

2. The ribbon loading container of claim 1 wherein said first and second tension means are tension springs mounted on said ribbon dam.

3. The ribbon loading container of claim 2 wherein said tension springs are two U-shaped clips disposed adjacent each other on said ribbon dam having interior sides frictionally engaging the ribbon adjacent said slip and exterior sides frictionally engaging said housing.

4. The ribbon loading container of claim 1 further including cooperative alignment means disposed on said housing and ribbon dam to guide said ribbon dam within said envelope of said housing.

5. The ribbon loading container of claim 4 wherein said cooperative alignment means includes a channel in said housing receiving a guide on said ribbon dam.

6. The ribbon loading container of claim 1 further including front and rear end caps mounted on said ends of said housing and including open apertures to allow the passage of the ribbon.

7. The ribbon loading container of claim 6 wherein said housing and end caps have an elongated slot therethrough.

8. The ribbon loading container of claim 7 further including an end cover and guide slots in said front end cap for slidingly receiving the sides of said end cover.

9. The ribbon loading container of claim 1 further including an end cover for said front open end.

10. The ribbon loading container of claim 8 wherein said end cover includes a latch for latching said end cover closed on said front open end.

11. The ribbon loading container of claim 10 wherein said latch includes a gate cut into said end cover having a molded lip which engages said end cap upon closure.

12. A ribbon loading apparatus for loading a length of printer ribbon in a cartridge, comprising:
    an elongated ribbon container having an envelope for housing the ribbon and front and rear open ends for the passage of the ribbon;
    a ribbon dam slidingly received within said envelope and having a slot therethrough for the passage of the ribbon;
    said ribbon dam further including first tension means for maintaining frictional engagement with the ribbon and second tension means for maintaining frictional engagement with said housing whereby the ribbon may be introduced into said front open end and become housed within said housing against the back pressure of said ribbon dam due to said second tension means;
    a support plate for supporting said ribbon container;
    position means for positioning said ribbon container on said support plate; and
    a drive roller and a driven roller rotatably mounted on said support plate outside of said ribbon container and having a portion of said rollers projecting into said front open end of said ribbon container for driving the ribbon into said envelope of said ribbon container against a back pressure provided by said ribbon dam.

13. The ribbon loading apparatus of claim 12 wherein said drive roller and driven roller drive the ribbon against a ribbon dam slidingly received within said ribbon container.

14. A ribbon loading apparatus for loading a length of printer ribbon in a cartridge, comprising:
    an elongated ribbon container having an envelope for housing the ribbon and front and rear open ends for the passage of ribbon;
    a support plate for supporting said ribbon container;
    position means for positioning said ribbon container on said support plate;
    a drive roller and a driven roller projecting into said front open end of said ribbon container for driving the ribbon into said envelope of said ribbon container;
    said drive roller and driven roller driving the ribbon against a ribbon dam slidingly received within said ribbon container;
    said driven roller being rotatably mounted on an end of an arm rotatably disposed on said support plate.

15. The ribbon loading apparatus of claim 14 wherein said arm includes adjustment means for adjusting the positioning of said driven roller with respect to said drive roller.

16. The ribbon loading apparatus of claim 15 wherein said adjustment means includes an eccentric shaft on which said arm is rotatably disposed on said support plate whereby rotation of said eccentric shaft adjusts the positioning of said driven roller.

17. A ribbon loading apparatus for loading a length of printer ribbon in a cartridge, comprising:
- an elongated ribbon container having an envelope for housing the ribbon and front and rear open ends for the passage of the ribbon;
- a support plate for supporting said ribbon container;
- position means for positioning said ribbon container on said support plate;
- a drive roller and a driven roller projecting into said front open end of said ribbon container for driving the ribbon into said envelope of said ribbon container;
- said drive roller and driven roller driving the ribbon against a ribbon dam slidingly received within said ribbon container; and
- strippers disposed on said support plate adjacent said rollers for ensuring that the ribbon does not wrap around said rollers.

18. The ribbon loading apparatus of claim 17 wherein said rollers include a plurality of elastomeric annular surfaces and said strippers include a plurality of curved fingers that project into annular spaces between said elastomeric annular surfaces of each of said rollers.

19. A ribbon loading apparatus for loading a length of printer ribbon in a cartridge, comprising:
- an elongated ribbon container having an envelope for housing the ribbon and front and rear open ends for the passage of the ribbon;
- a ribbon dam slidingly received with said envelope and having a slot therethrough for the passage of the ribbon;
- a support plate for supporting said ribbon container;
- position means for positioning said ribbon container on said support plate;
- a drive roller and a driven roller rotatably mounted on said support plate and projecting into said front open end of said ribbon container for driving the ribbon into said envelope of said ribbon container against a back pressure provided by said ribbon dam;
- said position means including at least one guide disposed on said support plate and engaging a side of said ribbon container.

20. The ribbon loading apparatus of claim 19 wherein said ribbon container includes an end cover for closing said front open end and said guide includes a slot for housing said end cover during the loading of the ribbon into said ribbon container.

21. The ribbon loading apparatus of claim 20 wherein said guide includes detent means for releasably holding said end cover in position within said slot.

22. An apparatus for loading a ribbon, comprising:
- a pallet;
- an accumulator disposed on said pallet and having a chamber for receiving a leader for the ribbon, said chamber having an inlet and outlet therethrough for the passage of the leader and ribbon;
- means for drawing a measured length of leader into said chamber;
- a ribbon container having an envelope for housing the ribbon and positioned on said pallet;
- a ribbon dam slidingly received within said envelope and having a slot therethrough for the passage of the ribbon;
- said ribbon dam further including first tension means for maintaining frictional engagement with the ribbon and second tension means for maintaining frictional engagement with said housing whereby the ribbon may be introduced into said front open end and become housed within said housing against the back pressure of said ribbon dam due to said second tension means;
- a drive roller and driven roller rotatably mounted on said pallet outside of said ribbon container and having a portion of said rollers projecting into said envelope of said ribbon container for stuffing ribbon into said ribbon container against a back pressure provided by said ribbon dam.

23. The apparatus of claim 22 wherein said means includes a drive roller and driven roller rotatably disposed on said pallet adjacent said inlet.

24. The apparatus of claim 23 wherein said accumulator includes strippers adjacent said rollers thereby preventing the leader ribbon from wrapping around said rollers.

25. The apparatus of claim 22 further including a pair of rollers rotatably disposed on said pallet adjacent said outlet and outside of said ribbon container.

26. An apparatus for loading a ribbon comprising:
- a pallet;
- an accumulator disposed on said pallet and having a chamber for receiving a leader for the ribbon, said chamber having an inlet and outlet therethrough for the passage of the leader and ribbon;
- means for drawing a measured length of leader into said chamber;
- a ribbon container having an envelope for housing the ribbon and positioned on said pallet;
- a driver roller and driven roller rotatably projecting into said envelope of said ribbon container for stuffing ribbon into said ribbon container; and
- clamping assemblies disposed on said pallet for clamping and holding the ends of the ribbon.

27. A method of loading ribbon into a ribbon loading container, comprising the steps of:
- sliding a ribbon dam within the ribbon loading container to the front end of the ribbon loading container;
- threading the ribbon between a drive roller and a driven roller;
- threading the ribbon through the envelope of the ribbon loading container and through a slot in the ribbon dam;
- rotating the drive roller;
- stuffing the ribbon into the envelope of the ribbon loading container and against the ribbon dam;
- providing a back pressure against the ribbon by the ribbon dam;
- sliding the ribbon within the envelope as the ribbon overcomes the back pressure of the ribbon dam; and
- continuing the stuffing of the ribbon until the ribbon has slid the ribbon dam the length of the envelope to fill the envelope with ribbon.

28. A method of loading ribbon into a ribbon loading container, comprising the steps of:
- passing a pre-selected length of leader ribbon in an accumulator;
- threading the leader ribbon through a drive assembly, the envelope of the ribbon loading container, and a ribbon dam within the envelope;
- welding the end of the leader to the end of the ribbon;
- pulling the leader through the envelope and actuating the drive assembly to stuff the ribbon into the envelope against the ribbon dam;

continuing the stuffing of the ribbon into the envelope until a predetermined length of ribbon is housed within the envelope;

cutting the leader from the ribbon;

cutting the ribbon; and welding the free ends of the ribbon to form a continuous loop.

29. The method of claim 28 further including the steps of:

unloading the ribbon from the ribbon loading container by sliding the ribbon dam the length of the container; and loading the ribbon into a ribbon cartridge as the ribbon is pushed through the open end of the ribbon loading container.

* * * * *